US008285326B2

(12) United States Patent
Carmody et al.

(10) Patent No.: US 8,285,326 B2
(45) Date of Patent: Oct. 9, 2012

(54) MULTIPROTOCOL WIRELESS COMMUNICATION BACKBONE

(75) Inventors: Joseph P. Carmody, Lansdale, PA (US); Yu-Gene T. Chen, Glendale, AZ (US); Patrick S. Gonia, Maplewood, MN (US); Paul F. McLaughlin, Ambler, PA (US)

(73) Assignee: Honeywell International Inc., Morristown, NJ (US)

( * ) Notice: Subject to any disclaimer, the term of this patent is extended or adjusted under 35 U.S.C. 154(b) by 1601 days.

(21) Appl. No.: 11/306,516

(22) Filed: Dec. 30, 2005

(65) Prior Publication Data
US 2007/0155423 A1 Jul. 5, 2007

(51) Int. Cl.
*H04M 1/00* (2006.01)

(52) U.S. Cl. ............ 455/556.1; 455/41.2; 455/424; 455/432.2; 455/434; 455/503; 370/338; 370/401

(58) Field of Classification Search ........... 455/41.2, 455/424, 432.2, 434, 503, 556.1; 370/338, 370/401
See application file for complete search history.

(56) References Cited

U.S. PATENT DOCUMENTS

| | | |
|---|---|---|
| 3,643,183 A | 2/1972 | Geffe |
| 3,715,693 A | 2/1973 | Fletcher et al. |
| 3,758,885 A | 9/1973 | Voorman et al. |
| 4,264,874 A | 4/1981 | Young |
| 4,529,947 A | 7/1985 | Biard et al. |
| 4,614,945 A | 9/1986 | Brunius et al. |
| 4,812,785 A | 3/1989 | Pauker |
| 4,843,638 A | 6/1989 | Walters |
| 5,392,003 A | 2/1995 | Nag et al. |
| 5,428,602 A | 6/1995 | Kemppainen |
| 5,428,637 A | 6/1995 | Oliva, Jr. et al. |
| 5,430,409 A | 7/1995 | Buck et al. |
| 5,438,329 A | 8/1995 | Gastouniotis |
| 5,451,898 A | 9/1995 | Johnson |
| 5,481,259 A | 1/1996 | Bane |
| 5,642,071 A | 6/1997 | Sevenhans et al. |
| 5,659,303 A | 8/1997 | Adair, Jr. |
| 5,726,603 A | 3/1998 | Chawla et al. |
| 5,767,664 A | 6/1998 | Price |
| 5,809,013 A | 9/1998 | Kackman |
| 5,847,623 A | 12/1998 | Hadjichristos |

(Continued)

FOREIGN PATENT DOCUMENTS
CH 673184 2/1990
(Continued)

OTHER PUBLICATIONS

U.S. Appl. No. 11/161,565, 29 pages, filed Aug. 8, 2005.
(Continued)

*Primary Examiner* — Olumide T Ajibade Akonai
*Assistant Examiner* — Jaime Holliday
(74) *Attorney, Agent, or Firm* — Seager Tufte & Wickhem LLC

(57) ABSTRACT

Methods, devices and systems for integrating multiple communication systems including multiple wireless communication protocols into a single system are discussed. In an illustrative example, a communication system includes a device adapted to communicate via first and second wireless communication protocols. The system may further include local area network or other wired sub-network, with the device adapted for first and second protocols also being adapted to operate using the local area network or other wired sub-network.

22 Claims, 6 Drawing Sheets

U.S. PATENT DOCUMENTS

| | | | |
|---|---|---|---|
| 5,960,344 A * | 9/1999 | Mahany | 455/432.2 |
| 5,963,650 A | 10/1999 | Simionescu et al. | |
| 6,052,600 A | 4/2000 | Fette et al. | |
| 6,058,137 A | 5/2000 | Partyka | |
| 6,091,715 A | 7/2000 | Vucetic et al. | |
| 6,175,860 B1 | 1/2001 | Gaucher | |
| 6,353,846 B1 | 3/2002 | Fleeson | |
| 6,366,622 B1 | 4/2002 | Brown et al. | |
| 6,396,612 B1 * | 5/2002 | Bjorndahl | 398/121 |
| 6,414,963 B1 | 7/2002 | Gemar | |
| 6,624,750 B1 | 9/2003 | Marman et al. | |
| 6,659,947 B1 * | 12/2003 | Carter et al. | 600/300 |
| 6,768,901 B1 | 7/2004 | Osborn et al. | |
| 6,785,255 B2 | 8/2004 | Sastri et al. | |
| 6,823,181 B1 | 11/2004 | Kohno et al. | |
| 6,836,506 B2 | 12/2004 | Anderson | |
| 6,901,066 B1 | 5/2005 | Helgeson | |
| 2002/0011923 A1 | 1/2002 | Cunningham et al. | |
| 2002/0085622 A1 | 7/2002 | Dhar et al. | |
| 2002/0141479 A1 | 10/2002 | Garcia-Luna-Aceves et al. | |
| 2003/0050062 A1 * | 3/2003 | Chen et al. | 455/435 |
| 2003/0053555 A1 | 3/2003 | McCorkle et al. | |
| 2003/0063585 A1 | 4/2003 | Younis et al. | |
| 2003/0104816 A1 * | 6/2003 | Duplessis et al. | 455/448 |
| 2003/0151513 A1 | 8/2003 | Herrmann et al. | |
| 2003/0198280 A1 | 10/2003 | Wang et al. | |
| 2004/0077352 A1 * | 4/2004 | Mahany | 455/448 |
| 2004/0125775 A1 * | 7/2004 | Rios | 370/338 |
| 2004/0210766 A1 * | 10/2004 | Kroselberg | 713/201 |
| 2004/0253996 A1 | 12/2004 | Chen et al. | |
| 2005/0255892 A1 * | 11/2005 | Wong et al. | 455/562.1 |
| 2005/0281215 A1 | 12/2005 | Budampati et al. | |
| 2006/0035650 A1 * | 2/2006 | Amberny et al. | 455/462 |
| 2006/0133414 A1 * | 6/2006 | Luoma et al. | 370/466 |
| 2006/0171346 A1 | 8/2006 | Kolavennu et al. | |
| 2006/0174102 A1 * | 8/2006 | Smith et al. | 713/150 |

FOREIGN PATENT DOCUMENTS

| | | |
|---|---|---|
| DE | 4344172 | 6/1995 |
| EP | 0607562 | 7/1994 |
| EP | 0893931 | 1/1999 |
| EP | 1492272 | 12/2004 |
| WO | 0070527 | 11/2000 |
| WO | 0227640 | 4/2002 |
| WO | 03007162 | 1/2003 |
| WO | 03102705 | 12/2003 |
| WO | 2005029810 | 3/2005 |

OTHER PUBLICATIONS

"Medium Access Control (MAC) and Physical (PHY) Specifications," ANSI/IEEE Std 802.11, pp. 177-179, 1999.

"Product Specification for Advanced Pager Receiver UAA2082", Philips, Integrated Circuits, 41 pages, Jan. 15, 1996.

"ZigBee Wireless Networking Software," EmberNet ZigBee, 2 pages, prior to Jun. 17, 2005.

Abidi, "Direct-Conversion Radio Transceivers for Digital Communications," IEEE Journal of Solid-State Circuits, vol. 30, No. 12, pp. 1399-1410, Dec. 1995.

Abidi, "Upconversion and Downconversion Mixers for CMOS Wireless Transceivers," copyright AAA, 42 pages, 1996.

Chang et al., "A CMOS Channel-Select Filter for a Direct-Conversion Wireless Receiver," IEEE Journal of Solid-State Circuits, vol. 32, No. 5, pp. 722-729, May 1997.

Cheng et al., "TPS: A Time-Based Positioning Scheme for Outdoor Wireless Sensor Networks," IEEE INFOCOM 2004, 12 pages, 2004.

Craig, "Zigbee: Wireless Control That Simply Works," 7 pages, prior to Jun. 17, 2005.

Crols et al., "CMOS Wireless Transceiver Design," Kluwer Academic Publishers, 22 pages, 1997.

Figueiredo et al., "The PUNCH Virtual File System: Seamless Access to Decentralized Storage Services in a Computational Grid," 10 pages, prior to Dec. 30, 2005.

ARC Advisory Group, "Honeywell Experion PKS R300," ARC White Paper, 12 pages, Apr. 2005.

Honeywell, "Wireless Pressure Gage Modernization Pressure Measurement for All Industries," 12 pages, prior to Dec. 30, 2005.
http://content.honeywell.comimc/fi/wirelessTransmitters, "Honeywell XYR Wireless Transmitters," 2 pages, Sep. 7, 2005.

Honeywell, "XYR Wireless Transmitters, Extending Your Online Measurement Capabilities Easily, Flexibly, Affordably," Honeywell International Inc., 2 pages, Jun. 2005.

Honeywell, "XYR Wireless Transmitters, Industrial Measurement and Control," 2 pages, Oct. 2003.
http://wiki.personaltelco.net/index.cgi/PhasedArray?action=print,
"Phased Array—Personal Telco Wiki," 3 pages, May 2, 2005.
http://www.bamboweb.com/articles/o/s/OSI_model.html,
"Bambooweb OSI model," Bambooweb Dictionary, 5 pages, printed May 23, 2005.
http://www.dailywireless.org/modules.php?name=News&file=article&sid=871, "Location by Triangulation—Not," Daily Wireless, 2 pages, printed May 2, 2005.
http://www.unstrung.com/document.asp?site=unstrung&doc_id15069&page_number=1, 11 pages, printed May 2, 2005.
http://www.zigbee.org/en/about/faq.asp, "Wireless Control That Simply Works," ZigBee Alliance, 8 pages, printed Feb. 2, 2005.
http://www.pepei.pennnet.com/Articles/Article_Display.cfm?Section=Archi&Subsection=Display..., "Power Engineering Wireless Power Plant Applications Poised for Expansion," 5 pages, printed Sep. 7, 2005.

Jung et al., "Improving IEEE 802.11 Power Saving Mechanism," 6 pages, Jul. 7, 2004.

Kapadia et al., "PUNCH: An Architechture for Web-Enabled Wide Area Network Computing," Cluster Computing 2, pp. 153-164, 1999.

Kapadia et al., "PUNCH: Web Portal for Running Tools," IEEE, pp. 38-47, 2000.

Kinney, "ZigBee Technology: Wireless Control That Simply Works," 20 pages, Oct. 2, 2003.

Lee, "The Design of CMOS Radio-Frequency Integrated Circuits," Cambridge University Press, 42 pages, 1998.

Milstein, "Wideband Code Division Multiple Access," IEEE Journal on Selected Areas in Communications, vol. 18, No. 8, pp. 1344-1354, Aug. 2000.

Moulding et al., "Gyrator Video Filter IC with Automatic Tuning," IEEE Journal of Solid-State Circuits, vol. SC15, No. 6, Dec. 1980, pp. 963-968.

Nasipuri et al., "A Directionality Based Location Discovery Scheme for Wireless Sensor Networks," pp. 105-111, prior to Jun. 17, 2005.

Razavi, "Design Considerations for Direct-Conversion Receivers," IEEE Transactions on Circuits and Systems—II: Analog and Digital Signal Processing, vol. 44, No. 6, pp. 428-435, Jun. 1997.

Rofougaran et al., "A 1 GHz CMOS RF Front-End IC for a Direct-Conversion Wireless Receiver," IEEE Journal of Solid-State Circuits, vol. 31, pp. 880-889, Jul. 1996.

Rofougaran et al., "A 900 MHz CMOS RF Power Amplifier with Programmable Output Power," Proceedings VLSI Circuits Symposium, Honolulu, 4 pages, Jun. 1994.

Savvides et al., "Dynamic Fine-Grained Localization in Ad-Hoc Networks of Sensors," pp. 166-179, prior to Jun. 17, 2005.

Want et al. "The Active Badge Location System," 7 pages, prior to Jun. 17, 2005.

Wilson et al., "A Single-Chip VHF and UHF Receiver for Radio Paging", IEEE Journal of Solid State Circuits, vol. 26, No. 12, 9 pp. 1944-1950, Dec. 1991.

Ega-Lopez et al., "Wireless communications deployment in industry: a review of issues, options and technologies," Elsevier Science vol. 56, No. 1 pp. 29-53, Jan. 2005.

* cited by examiner

MULTIPROTOCOL WIRELESS COMMUNICATION BACKBONE

FIELD

The present invention is related to the field of wireless networking. More particularly, the present invention relates to the integration of wireless networking and traditional wired communication systems.

BACKGROUND

Modern industrial control and monitoring systems make use of a blend of a number of different systems. These systems may include a variety of sensors (pressure, temperature, vibration), actuators, controllers, cameras, etc. To integrate the systems, layers of communication, data, and control protocols have been developed. One example that has been used in some applications is the Purdue model, which defines several different network levels for a system, with each level having a different format and type of communication, and further with varying levels of abstraction.

To facilitate such systems, a typical approach has been to provide a separate controller or control module for each different subsystem at the lowest network level. Each controller communicates with one or more sensors or control devices that operate to monitor or control an industrial system. This set of controllers may be connected to an Ethernet or other collective communication network allowing for controller input/output and sensor data to be communicated thereon. Above this base network is a hardwired network control system or supervisory control, which may also include a distributed control system.

By separating the distributed control system from the sensing and control network by a firewall/switch, the security of the plant may be ensured. Yet another network, sometimes termed a business-level local area network, is coupled to the distributed control system at yet a higher level. As the networks go to higher levels, the computation and analysis, particularly using advanced and/or third party applications, becomes more complex and abstract. However, reliability and security may be reduced at the higher levels.

A challenge in this environment is to provide efficient methods, systems and devices that allow for expansion and updating of older systems.

SUMMARY

The present invention in various illustrative examples includes methods, devices and/or systems for integrating multiple communication systems including multiple wireless communication protocols into a single system. In an illustrative example, a communication system includes a device adapted to communicate via first and second wireless communication protocols. The illustrative system may further include a local area network or other wired sub-network, with the device adapted for first and second protocols also being adapted to operate using the local area network or other wired sub-network.

DETAILED DESCRIPTION

Figure 1:
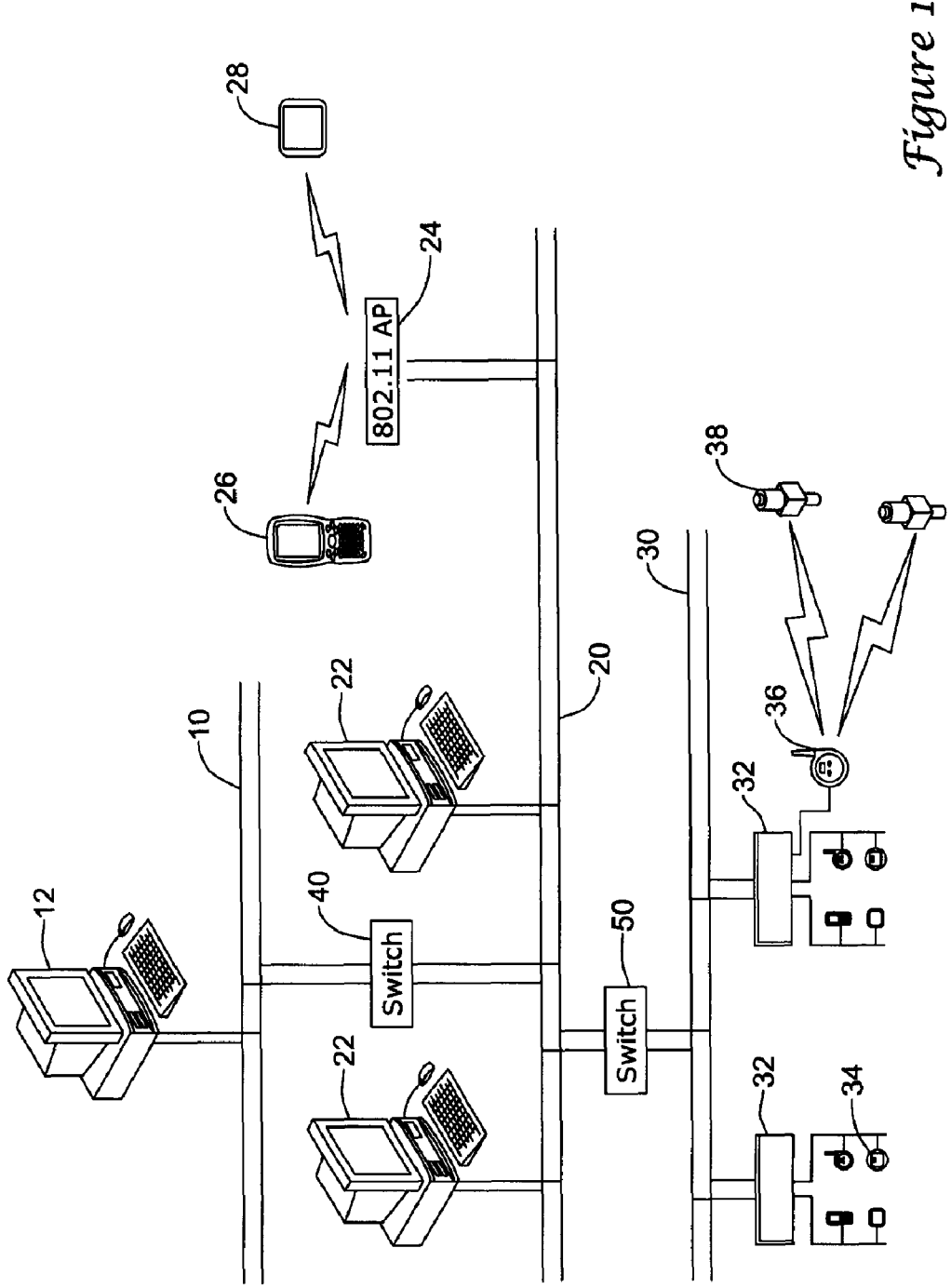
FIG. 1 illustrates an industrial monitoring and control system divided into tiers and having various devices in communication therewith.

The following detailed description should be read with reference to the drawings. The drawings, which are not necessarily to scale, depict illustrative embodiments and are not intended to limit the scope of the invention.

As used herein, the term "wireless" communication indicates the transmission of data via an ambient medium, for example, air. A non-wireless communication includes a communication achieved by transmission of data via a physical conduit, channel, or other defined communication path over solid media. Examples of such defined communication paths for non-wireless communication include copper or other conductive wires, optical fibers, coaxial and other cables, and any of a plethora of other known (or to be developed) communication or transmission lines. No specific structure is implied by either term (wireless or non-wireless), nor is the use of a particular band of frequencies, wavelengths, bit rates, or modulation protocol implied.

One aspect of the present invention is the recognition that new and evolving technologies create a difficulty of redundancy in certain communication networks. In earlier generations, with wired industrial control and monitoring systems, a central location and central limitation of movement for higher level devices made sense. For example, early personal computers, even those that were considered "portable," really were not reasonably portable, or sufficiently powerful, for use within an industrial facility, however, recently developed small, lightweight, but powerful handheld devices provide new capabilities.

With this evolution in mobile wireless computing devices, powerful mobile communication devices have become more available. There are various types of wireless devices that may be used in an industrial control and monitoring system. For example, Honeywell has developed its XYR 5000 base radio systems that operate at what may be considered levels 0 and/or 1 of the Purdue model. Meanwhile, various groups have collaborated to create numerous standards for wireless communication including those promulgated under IEEE 802.11 and other commercial protocols. For example, one may now use such systems as IntelaTrac® (an 802.11 system), Blackberry® or Bluetooth® to communicate with handheld devices. Some such handheld devices have been developed with sufficient durability to allow their practical use in dusty, hot, cold, damp and high-vibration environments, making them amenable to industrial use.

In an illustrative embodiment, a network backbone is provided by the use of one or more devices having wireless communications capability including programming allowing for communication using various wireless communication protocols. More particularly, such a backbone device may be adapted to communicate in several of the 802.11 protocols. Further, this backbone device may include processing capability allowing it to segregate the networks with which it communicates, preserving the security of a lower level system while allowing the versatility of the higher level system. Alternatively, the backbone device may generally operate to segregate the networks with which it operates, while also having functionality as a gateway device between first and second wireless communication systems.

FIG. 1 illustrates an industrial monitoring and control system divided into tiers and having various devices in communication therewith. The tiers of the system generally include a business local area network (LAN), shown at 10, which may include one or more computers 12 making use of the network. The business LAN 10 may be connected to the internet. The computers 12 on the business LAN 10 may use various third-party, relatively high level of abstraction programs including various advanced applications known to the general public (Microsoft® or Macintosh® products, for example).

A next layer is shown as second layer LAN 20, and includes workstation computers 22 that may provide supervisory control features as well as, if desired, some limited use of third party advanced applications as well. More importantly, the second layer LAN 20 may include distributed control stations and servers 22. One function of the second layer LAN 20 may be to provide a graphical user interface for those in charge of controlling and monitoring the plant. In addition to the workstation computers 22, this second layer LAN 20 may be coupled to a wireless access point 24 that enables the use of so-called mobile workers 28 and other portable wireless devices 26. Some brand names for wireless worker solutions may include IntelaTrac, WebPad, and/or Trakker, though it should be understood that other existing (and to be developed) portable wireless devices may be included at this level.

The second layer LAN 20 may be referred to as a plant control network. The second layer LAN 20 may be, for example, a fault tolerant Ethernet. The use of a fault tolerant Ethernet for the plant control network increases the security and safety of the plant itself by assuring that at least some critical systems (such as emergency detection, control, annunciation, and/or response) are fault tolerant.

A lowest layer is shown as third layer LAN 30 and may include controllers 32. The communications in the third layer LAN 30 generally may comprise sensor data and controller input/output queries and commands. The controllers 32 may be wired to a number of devices shown generally at 34. The devices 34 may include various sensors, detectors, or the like to allow monitoring of an industrial plant. The devices 34 may further include such actuators (such as valves, conveyance apparatuses, burners, vents, etc.) as are used in a given industrial facility to enable management and control over operations. Different controllers 32 may be directed to different parts of a plants operation (for example, separate controllers 32 may be coupled to sensors/actuators for systems such as material conveyance, material processing, heating/cooling, power, or emergency systems, etc.) and/or to different types of plant operations (for example, pressure sensors for a particular system may be coupled to one controller 32, while actuators for that system may be coupled to a separate controller 32).

Also shown in FIG. 1 is a simplified illustration of a Honeywell® XYR radio system including a base radio 36 and sensors 38. Instead of sensors 38, actuators could also be shown. The radio system including the base radio 36 and sensors 38 allows for quick, relatively cheap installation of new sensing or monitoring devices. The base radio 36 is shown as one of several devices that are coupled to a controller 32, which enables access to data from the third layer LAN 30. Alternatively, the base radio 36 may itself be hardwired to the third layer LAN 30.

In the illustrative system, switches are shown at 40, 50 to illustrate the separation of each LAN 10, 20, 30, from other layers. The data transmitted on each LAN 10, 20, 30 may be distinct as well. The switches 40, 50 selectively allow access between the network layers shown, for example, for the purpose of extracting information or providing control signals. The switches 40, 50 also provide security, preventing unauthorized access to lower layers of the network, and also isolating the lower network layers from the upper network layers in case, for example, there is a virus event, denial of service, or other fault or failure at a higher network level.

Each of the sensors and/or actuators is dedicated to one of the controllers 32 on the third layer LAN 30. If the base radio 36 is hardwired to the third layer LAN, the base radio 36 may act as the dedicated controller for the sensors/actuators that are in communication with the base radio 36. The result is that any access to data from the lower layers occurs by first sending requests for data transmissions through switch 50, addressed to the appropriate controller 32. The request then waits in queue (if necessary) for the appropriate controller 32 to generate a response.

Figure 2:
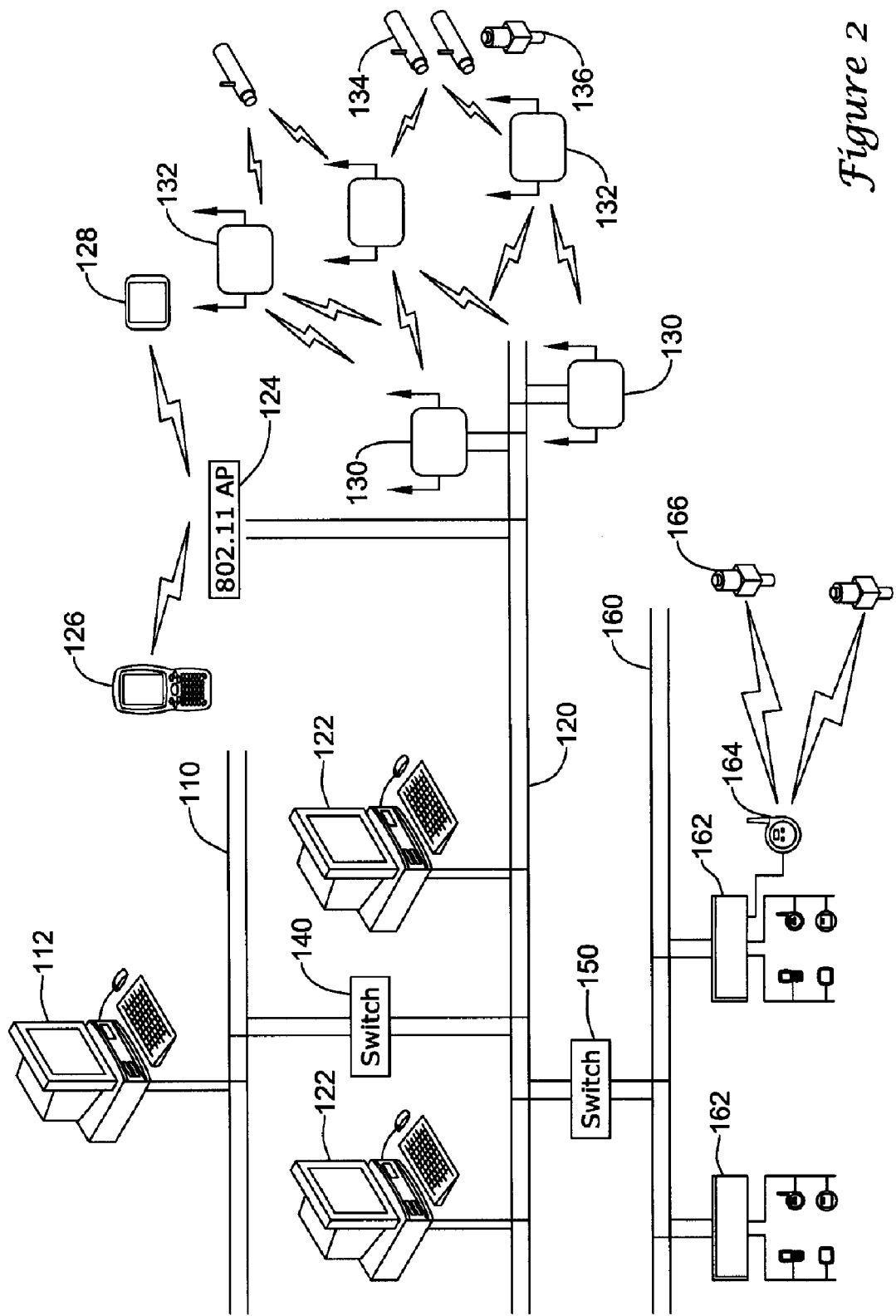
FIG. 2 illustrates a system that illustrates at least some versatile wireless gateway and infrastructure nodes.

FIG. 2 illustrates a system that, in contrast to FIG. 1, includes some versatile wireless gateway and infrastructure nodes. In the illustrative example, the business LAN 110 having one or more computers 112 connected thereto is coupled to a plant control network LAN 120. The plant control network LAN 120 may include one or more workstations 122 that again provide a graphical user interface and advanced applications to access and control plant control systems. In the illustrative example, a gateway node 130 has been added to the plant control network LAN 120. The gateway node 130 may communicate wirelessly with one or more infrastructure nodes (I-nodes) shown 132 that, in turn may communicate with cameras 134 and/or sensors 136. Alternatively, the gateway node 130 may communicate wirelessly directly with one or more of the wireless cameras 134 and/or wireless sensors 136.

In some embodiments, the cameras 134 and/or sensors 136 may be considered leaf nodes in a wireless network having leaf nodes and infrastructure nodes 132, as described in copending U.S. patent application Ser. No. 10/870,295, entitled WIRELESS COMMUNICATION SYSTEM WITH CHANNEL HOPPING AND REDUNDANT CONNECTIVITY, filed Jun. 17, 2004, and copending U.S. patent application Ser. No. 10/905,971, entitled WIRELESS ROUTING SYSTEMS AND METHODS, filed Jan. 28, 2005, which are each incorporated herein by reference.

In other embodiments, the devices shown at 132 are simply network radios that operate to provide the backbone for the distributed network, without requiring a specific leaf node and infrastructure node configuration as set forth in these copending patent applications. These network radios, in some embodiments, may be adapted for communicating using a plurality of protocols, including at least first and second wireless communication protocols. By providing multiple protocols on the same backbone, redundancy with the existing systems can be avoided. Specifically, where N devices may be needed for a single network to cover a given area, if two networks that are incompatible area provided, 2*N devices would be needed, assuming that devices in the networks have similar capabilities. Using a backbone having multiple-protocol capability can reduce the number of needed devices. Further, as computing capacity increases in the future, restrictions related to the ability of individual communications devices to handle a given load may, simply put, go away.

In the embodiment of FIG. 2, the plant control network 120 is illustratively shown as being coupled to a wireless access point 124 that communicates independently with one or more wireless devices 126 or wireless worker devices 128. Also shown is the lowest layer network 160 which may be referred to as a controller network 160, again including controllers 162 and a simplified XYR radio system having base radio 164 and sensor 166. As before, firewalls or switches shown at 140, 150 are used to isolate the networks 110, 120, 160 from one another.

In some embodiments, the gateways 130 and/or I-nodes 132 may take a form as described in copending U.S. patent application Ser. No. 11/161,565, entitled INTEGRATED INFRASTRUCTURE SUPPORTING MULTIPLE WIRELESS DEVICES, filed on Aug. 8, 2005, the disclosure of which is incorporated by reference.

Figure 3:
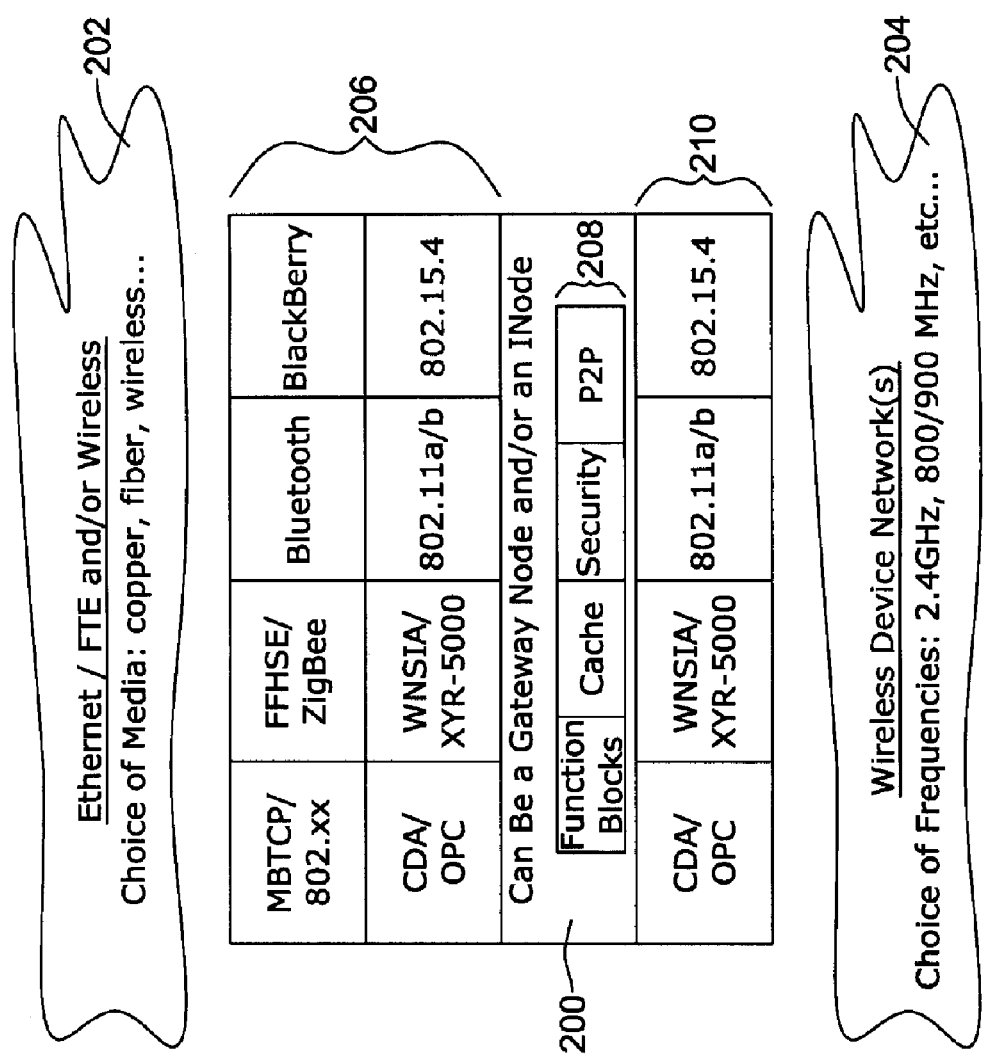
FIG. 3 shows, in a functional block diagram, a gateway or infrastructure node for use in some embodiments.

FIG. 3 shows, in a functional block diagram, a gateway, infrastructure node, or network radio for use in some such embodiments. The device is shown generally at 200 in a functional block form. The device 200 is adapted for communication in multiple formats including, for example, one or more of Ethernet, FTE and/or wireless communications as shown at 202. The device 200 is also shown as being adapted for communication in various wireless device forms at various frequencies such as 2.4 GHz, 900 or 800 MHz, etc., as shown at 204.

While certain existing "gateway" nodes or access points are adapted to provide communication between a wired network or Ethernet and a mobile device, some illustrative embodiments take the concept farther by integrating additional communication modes. At least some illustrative embodiments will achieve synergies within an overall system by integrating a plurality of communication types. This may include the omission/elimination of redundant gateway or network nodes.

In the illustrative embodiment shown in FIG. 3, the device 200 is adapted to enable data transfer using one of the several noted protocols including, for example, Bluetooth, Blackberry, ZigBee, XYR-5000 or other protocols for wireless networks for secure industrial applications (WNSIA). Other protocols are noted at 206. Meanwhile, the device 200 is also adapted to provide, as separate functions 210, a second wireless protocol such as those noted at 210. The specific protocols listed at 206 and 210 are merely illustrative. For example, the I-Nodes may support multiple wired or wireless protocols by simply storing and forwarding messages (of multiple protocol types). Gateways on the other hand may support multiple wired or wireless protocols and may translate messages from one protocol to another.

As noted at 208, the gateway node, INode, or network radio may include the function blocks for performing wireless functions in addition to cache circuitry/capability, security, and other peer-to-peer functionality. In some embodiments, the inclusion of multiple wireless protocols calls for additional processing steps for the device 200. For example, messages being exchanged on a first network may be segregated from those exchanged on a second network, calling for tiered addressing as set forth in copending U.S. patent application Ser. No. 11/161,565, entitled INTEGRATED INFRASTRUCTURE SUPPORTING MULTIPLE WIRELESS DEVICES, which is incorporated herein by reference. For another example, security may be provided by filtering received messages in accordance with protocols for the network to which such commands are addressed. This may be so for messages communicated within one network as well as for messages addressed from one network to a second network.

Because the first and second networks may have different levels of security, a message received from one network that is addressed to the other may be subjected to differing levels of security screening depending upon which direction it is going. For example, a message M directed from high security network A to low security network B may undergo a simple frame check sequence (FCS) security check and then be allowed to switch networks, with any attendant format change due to the shift in networks. For example, if network A is a ZigBee protocol network, while network B is a Bluetooth network, the message format, frequency, etc. may be modified. The device 200 may include look-up tables or function blocks with instruction sets for performing such modifications.

Continuing the example, if a message N is directed from low security network B to high security network A, additional security screening may be performed on the message N in addition to the FCS. For example, the addressing of the message N may be compared to tables for authorized senders and/or to determine whether the message N is properly addressed to a device on network A. The message contents may be screened for content (i.e. virus checked) as well.

In some embodiments where multiple tiered networks are involved, the device 200 may operate to allow unidirectional access between networks. For example, access from one network to another may be allowed by the device 200, while access going the other direction is blocked. This may allow a central device (i.e. switches 140, 150 in FIG. 2) to control access in one direction, thus improving security in that direction, while opening up access going the other direction. For example, results of processes being run in the controller network 160 (FIG. 2) may be reported to the plant control network 120 (FIG. 2) in response to requests from the plant control network 120 (FIG. 2).

In yet another illustrative embodiment, the multiple, tiered networks are treated in completely segregated manner by distributed network radios. Specifically, some messages received by the device 200 may be identified as belonging to one network and may be directed for further communication within that network, while other messages directed to a different network are directed differently. In this manner, security remains generally uncompromised.

Figure 4:
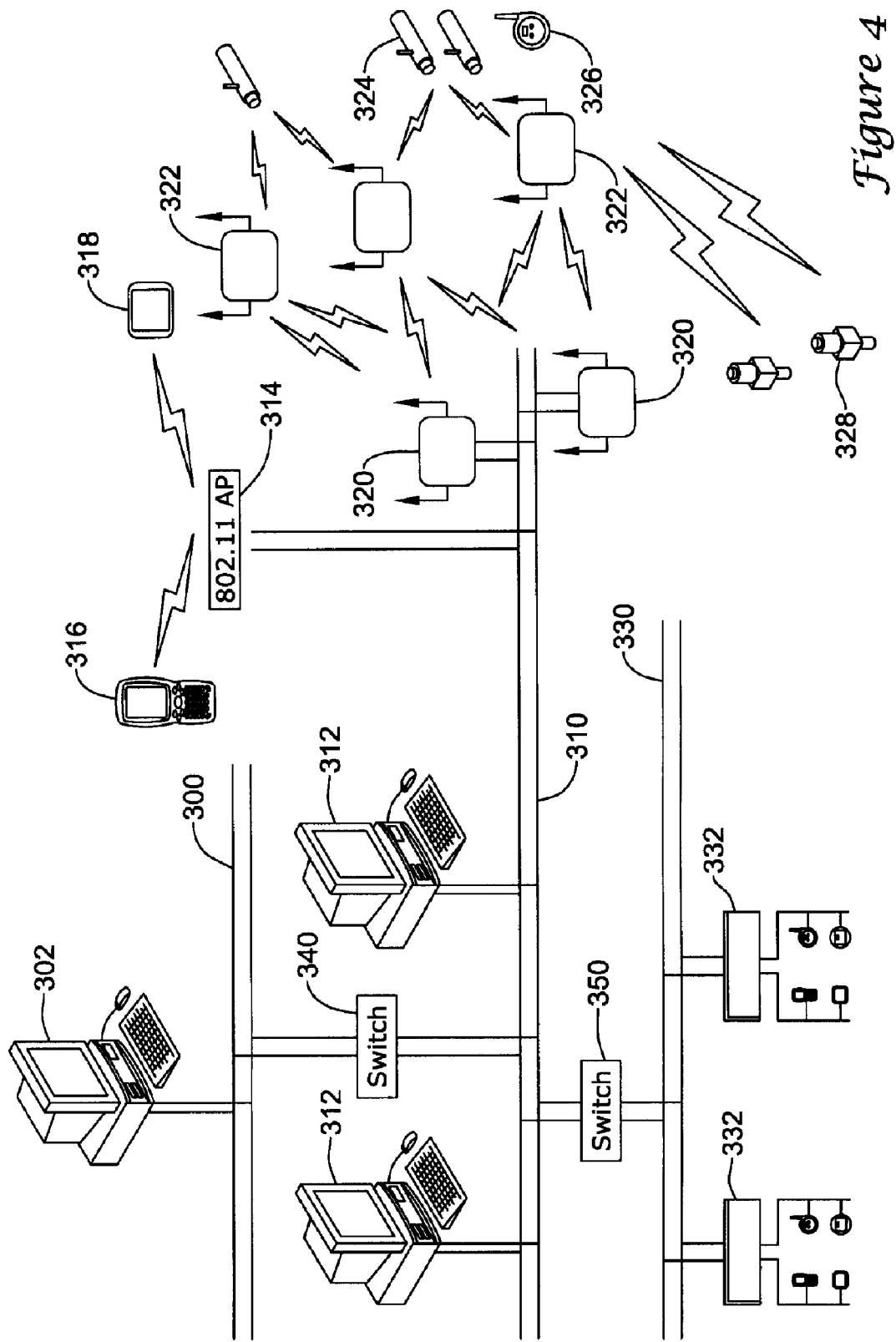
FIG. 4 illustrates a system having further integration of communication operations and versatility than that of FIG. 2.

FIG. 4 illustrates a system having further integration and versatility than that of FIG. 2. In the illustrative embodiment, again, a business LAN 300 is shown having at least one computer 302. The business LAN 300 is coupled via a switch 340 to a plant control network 310. The plant control network 310 includes at least one workstation 312. The plant control network 310 is also coupled to an access point 314 that may communicate with wireless devices 316 and/or mobile worker devices 318. One or more gateways 320 are coupled to the plant control network, with at least one gateway 320 taking the form of a device 200 as shown in FIG. 3.

The gateway(s) 320 communicates with one or more I-nodes or network radios 322, which may, in turn, communicate with various devices 324, 326 as before. In the illustrative embodiment of FIG. 4, the I-nodes/network radios 322 and/or gateway(s) 320 may also communicate with the XYR radio-enabled sensors 328. Specifically, at least one base station for the XYR radios has been omitted. In the illustrative embodiment, the gateway 320 or one of the I-nodes/network radios 322 may perform the data management and/or storage functions that would be performed by a controller from the controller network 330 if it were coupled to the XYR sensors 328.

The illustrative embodiment also shows the controller network 330 as including controller(s) 332 that are coupled to other, hardwired sensors 334. In some embodiments, the use of the gateway(s) 320 and/or I-nodes/network radios 322 to wirelessly communicate with not only devices that form part of the plant control network but also with devices that fall into the lower level controller network makes it possible to entirely omit the controller network and/or replace it. In such an embodiment, the wireless network including the wireless sensors 328, I-nodes/network radios 322 and gateway(s) 320 may be configured to treat the communications using the sensors 328 separately from other communications carried by the wireless network.

In some embodiments, rather than communicating directly with the XYR-enabled sensors/actuators 328, the I-nodes/network radios 322 and/or gateways 320 may communicate with an XYR-enabled base radio in either a wired or wireless fashion. While XYR-enabled devices are shown and described, it should be understood that the sensors 328 may take a number of different forms and use various protocols.

The illustrative embodiment of FIG. 4 may further include I-nodes that are configured to provide device setup and configuration forms for establishing or modifying the operation of devices in the system. For example, if XYR device 328 is either newly added or is to be reconfigured, a standardized configuration form may be used. The standard configuration form may be generated by any of several locations in the system including, for example, at any of the gateways 320, or I-nodes/network radios 322. In some embodiments, the standard configuration is controlled or provided by a computer 302 on the business level LAN 300. In other embodiments, the standard configuration may be controlled or provided by a workstation in the plant control network 310. For example, a worker operating the workstation 312 may provide inputs directing calibration of the XYR device 328. In yet another embodiment, a mobile device such as 316 or 318 may be used by a worker to provide configuration directions via the wireless nodes to the XYR device 328. The XYR device 328 may be considered a distributed device, as it is not wired into the rest of the system.

The standard configuration form may include various operations. In some embodiments, the standard configuration form is provided to allow various third parties to build units (monitoring equipment, control equipment, sensors, cameras, etc.) that accept input information via a standard configuration form. These third party units may be considered distributed units for use in the system, and may also allow definition of the types of outputs they will provide, as well as how the distributed unit will respond to directions from other devices in the system. The standard configuration form may allow various parameters to be selected and set including, for example, the form and type of data to be captured, the form and type of data to be reported out, frequency and timing of data transmission.

The standard configuration form may also receive selected data from a distributed device and may define the type and amount of data to be provided, and the acceptable range and response expected for the distributed device. For example, a characterization trend for the device output, the type of device providing output, actuator information, failsafe and other control data, and the like may be provided. In another example, the standard configuration form may allow the distributed device to provide indicators of its status. In summary, the standard configuration form may be adapted to allow a distributed device to identify itself and its available parameters and capabilities to the rest of the network, and also allows another device in the network to direct operation of the distributed device.

If so desired, the standard configuration may also be used for wired devices. In this manner, each device in the system may be treated the same, regardless of its position and the manner used to couple any given device to the rest of the system.

The standard configuration form may also be used to direct calibration steps and maintenance steps. For example, some sensors and actuators are adapted for periodic maintenance steps. When wireless distributed devices are used, especially portable devices, the inclusion/use of batteries in the distributed devices creates a need for periodic estimation of remaining battery life, or at least current battery status. The standard configuration form may provide a data entry features allowing a distributed device to indicate its desired periodic maintenance and/or calibration schedules, as well as allowing the results of such calibration or maintenance to be reported to the rest of the system.

Figure 5:
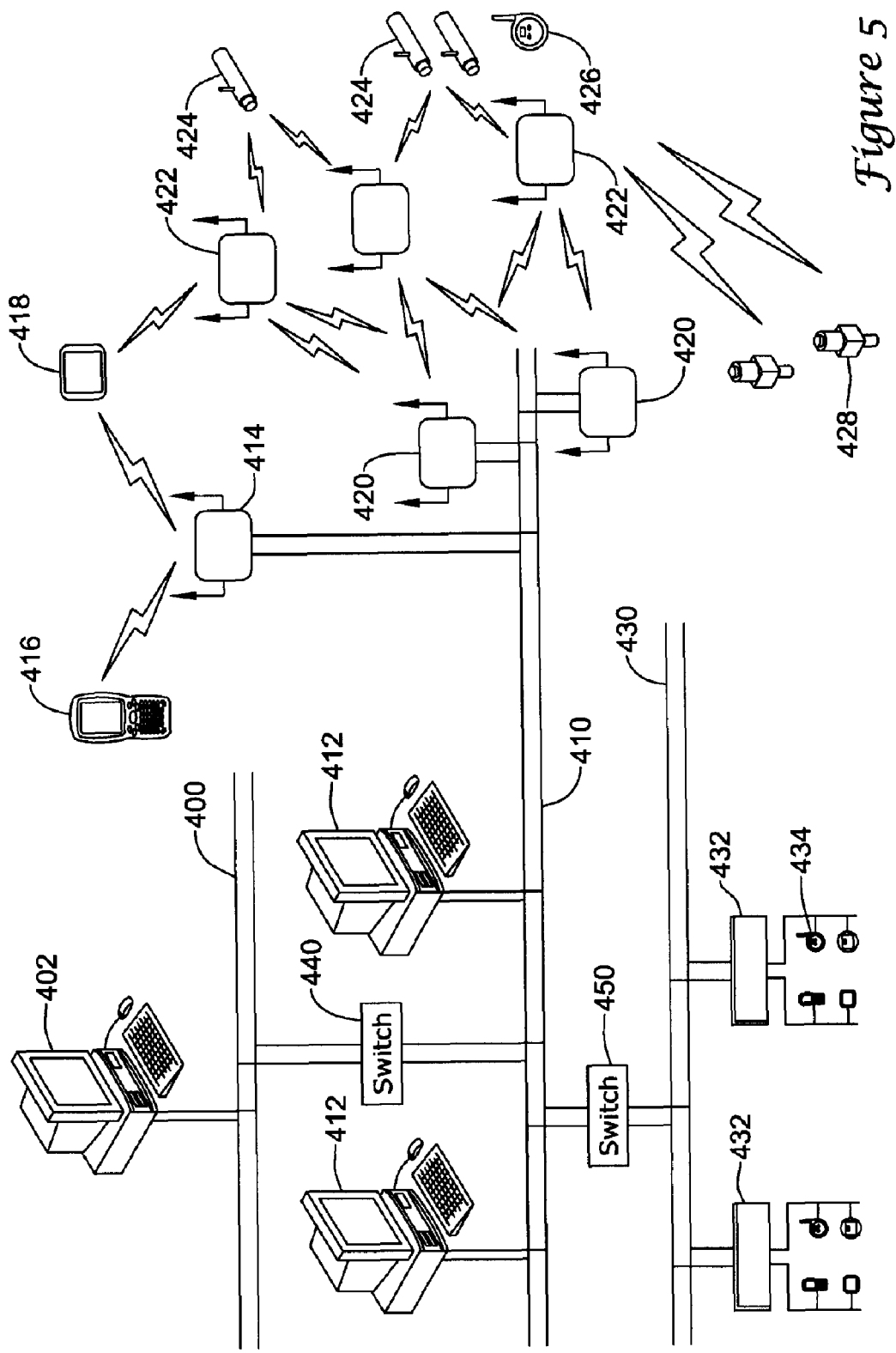
FIG. 5 shows full integration of a multiprotocol wireless backbone to an industrial monitoring and control system.

FIG. 5 shows full integration of a multiprotocol wireless backbone to an industrial monitoring and control system. In the illustrative embodiment, a business LAN 400 has at least one computer 402 coupled thereto. The business LAN 400 is coupled via switch 440 to the plant control network LAN 410. One or more workstations 412 may be part of the plant control network 410 LAN.

The illustrative embodiment in FIG. 5 also shows a controller network LAN 430 coupled via a switch 450 to the plant control network LAN 410. The controller network may include controllers 432 that couple to various hardwired sensors 434, or industrial valves, controllers etc.

In the embodiment of FIG. 5, gateway nodes 414, 420 are now used to provide communication not only to the I-nodes/network radios 422, leaf nodes 424, 426, and controller level sensors 428, but also provides communication capabilities for use with other wireless devices 416 and, if desired, mobile workers 418. In this instance, there may be devices communicating wirelessly over a backbone formed of the I-nodes/network radios 422 and gateways 414, 420 that has a number of tiers including high level communications with the mobile workers 416, 418, elements of the plant control network 410 that operate at an intermediate level, and items that would otherwise be part of the controller network 430. The communications for the wireless devices, while carried over the common medium of the wireless network, may nevertheless be isolated in separate virtual LANs such that traffic from one virtual LAN is not introduced onto the other without protection as offered on the wired LAN by switches 440 and 450.

The use of the wireless backbone provided by the gateways 420 and I-nodes/network radios 422 provides several forms of improvement. The inclusion of separate gateways/access points for multiple systems is avoided, reducing installation costs and complexity. Further, communications along the various networks in use can be more easily coordinated because the same backbone is used, potentially reducing noise and interference effects. Communication loads may be considered and, if overly reliant on one or a few nodes, redistributed, to potentially improve reliability, efficiency, and flexibility. If desired, redundant connectivity may be achieved as well, for example, as set forth in copending U.S. patent application Ser. No. 10/870,295, entitled WIRELESS COMMUNICATION SYSTEM WITH CHANNEL HOPPING AND REDUNDANT CONNECTIVITY, filed Jun. 17, 2004, and copending U.S. patent application Ser. No. 10/905,971, entitled WIRELESS ROUTING SYSTEMS AND METHODS, filed Jan. 28, 2005, which are each incorporated herein by reference.

Figure 6:
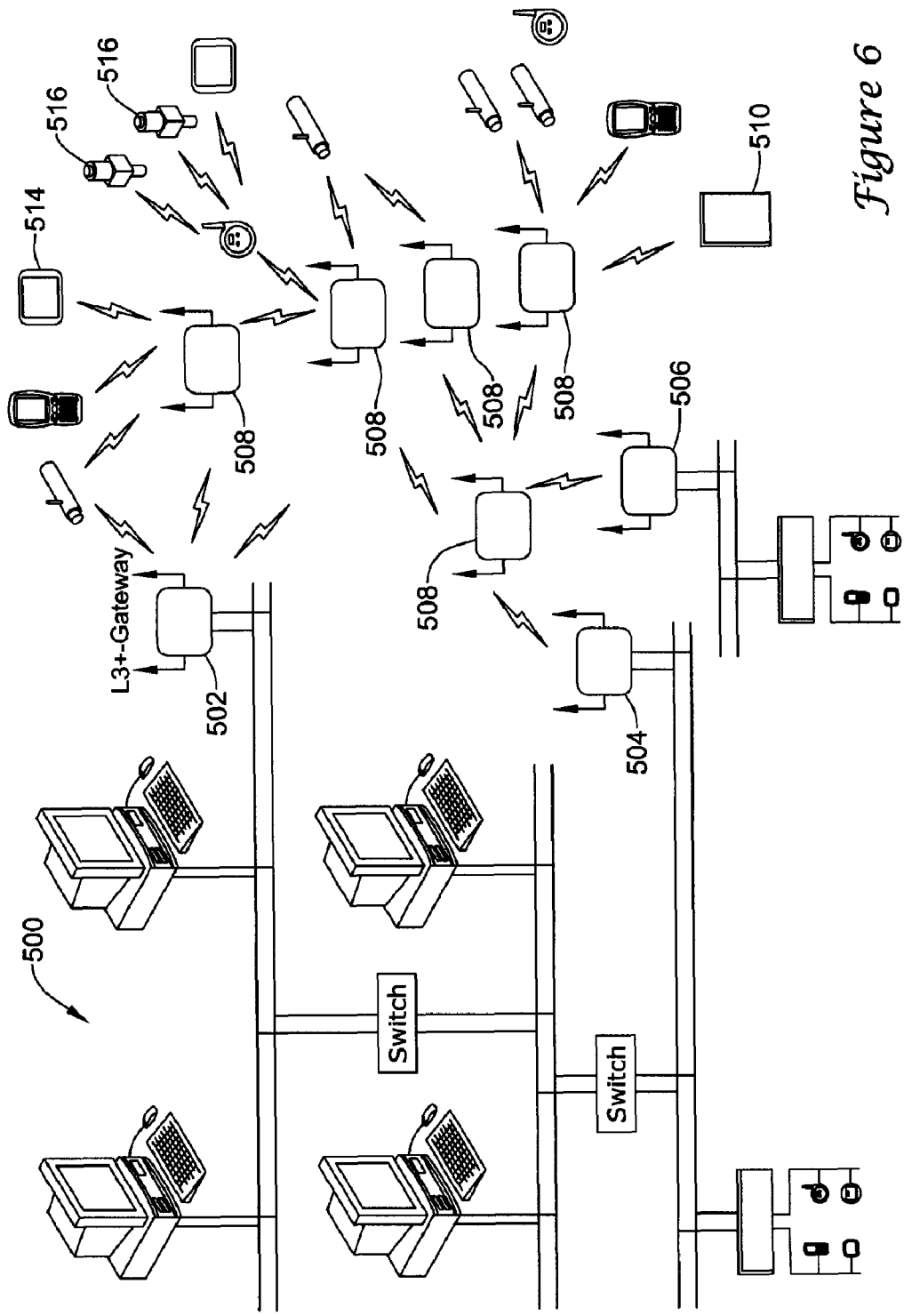
FIG. 6 illustrates another network including a multiprotocol wireless backbone having an additional level defined for data control.

FIG. 6 illustrates another network including a multiprotocol wireless backbone having an additional level defined for data control. In particular, FIG. 6 illustrates a similar network 500 having three levels as discussed above. Instead of (or, in some embodiments, in addition to) a gateway device at the middle or second tier, a gateway is provided at 502, the business application LAN. This gateway 502 may communicate directly with other devices, as indicated, or may communicate via network radios shown at 508. The network radios 508 discern the intended network of messages they receive and direct messages to appropriate destinations at the high level using gateway 502, or at a lower tier such as the first tier via gateway 504.

A separate LAN may also be served by gateway 506, which may couple to a network operating on any of the illustrative levels (business LAN, a process control LAN, or a controller LAN), though it is shown in communication with a wired controller, thereby operating at the lowest tier LAN. Various devices are shown in communication with the network radios 508 including mobile worker devices 514, other handhelds, sensors taking an XYR form 516, and even a third party devices shown at 510 which may be, for example, a programmable logic controller. The embodiment of FIG. 6 is one in which the operations by the mobile workers 514 are directed to the third tier, highest level LAN in what may be considered a level 3.5 LAN. The gateway 502 may perform a firewall function for these communications, assuring that the wired business-level LAN is secured from undesired wireless traffic.

The firewall functionality suggested for the gateway 502 may also be performed by the first tier gateway 504. While messages at various levels and in various virtual LANs may be exchanged by the gateways 502, 504, 506 and the network radios 508, whenever one of these devices performs base-station functionality, firewall protection may be provided to prevent unauthorized or undesired access into a LAN. A base-station functionality may include the translation of a message in a first LAN into a message into a second LAN, in other words, access of the second LAN by the first LAN.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. A wireless communication system comprising:
   a first device operating a first wireless communication protocol of a first wireless network;
   a second device operating a second wireless communication protocol of a second wireless network;
   a third device having control circuitry and transceiver circuitry, the control circuitry configured to operate the transceiver circuitry using each of the first wireless communication protocol and the second wireless communication protocol, wherein the third device further comprises input/output hardware configured for communicating in a non-wireless manner, the control circuitry being further configured to identify which of the first wireless communication protocol of the first wireless network or the second wireless communication protocol of the second wireless network is being used in association with a received message such that if the received message is identified as using the first wireless communication protocol of the first wireless network, the received message is directed for further communication within the first wireless network, and if the received message is identified as using the second wireless communication protocol of the second wireless network, the received message is directed for further communication within the second wireless network, wherein the control circuitry of the third device is further configured to direct data, when so addressed, from a wired network to the first device using the first wireless network or the second device using the second wireless network; and
   a fourth device coupled to the third device, the fourth device producing data related to one or more environmental or industrial conditions, wherein the third device receives and stores data from the fourth device.

2. The system of claim 1 wherein the first device is a mobile worker device.

3. The system of claim 1 wherein at least one of the first communication protocol and the second communication protocols is one of the plurality of IEEE® 802.11 wireless communication protocols.

4. The system of claim 3 wherein at least one of the first communication protocol and the second communication protocols is not one of the plurality of IEEE® 802.11 wireless communication protocols.

5. The system of claim 1 wherein the control circuitry of the third device is also configured to direct data, when so addressed, from the first device or the second device to a wired device on a wired network.

6. The system of claim 1 wherein the third device controls access to data from the fourth device.

7. The system of claim 1 wherein the third device is configured to identify and initialize added devices coupled to the wired network and allow for initialization of such added devices in a manner directed by one of the first device and the second device.

8. The system of claim 1 wherein the first and second wireless networks are not operating in direct communication with one another.

9. The system of claim 1 wherein the third device is configured to identify a device added to the system as being configured for communication with the first communication protocol or the second communication protocol, the third device further configured to perform steps to initialize the added device.

10. The system of claim 1 wherein the control circuitry of the third device is further configured to direct data, when so addressed, from one of the first device or the second device to the other of the first device or the second device.

11. A device comprising:
   one or more radio transceivers;
   input/output hardware configured for communicating using a non-wireless communication protocol;
   control circuitry coupled to the one or more radio transceivers, the control circuitry configured to perform:
   communications tasks related to a first wireless communication protocol of a first wireless network;
   communications tasks related to a second wireless communication protocol of a second wireless network;
   a determination of whether a communication received via the one or more radio transceivers belongs to a first wireless network; and
   a determination of whether a communication received via the one or more radio transceivers belongs to a second wireless network;
   wherein communications belonging to the first wireless network are segregated from communications belonging to the second wireless network; and
   wherein the communications tasks related to the first wireless communication protocol are performed in accordance with a first security protocol, and the communications tasks related to the second wireless communication protocol are performed in accordance with a second security protocol, wherein the first security protocol is different from the second security protocol;

wherein said device receives data from another device including data related to one or more environmental or industrial conditions.

12. The device of claim 11, wherein the control circuitry is further configured to direct data, when so addressed, from one of the first wireless network or the second wireless network to a wired network via the input/output hardware.

13. The device of claim 11, wherein the control circuitry is further configured to direct data, when so addressed, from a wired network to one of the first wireless network or the second wireless network.

14. The device of claim 11 wherein the control circuitry is further configured to direct data, when so addressed, from the first wireless network to the second wireless network when data is received having addressing allowing the data to be sent from the first wireless network to the second wireless network, including:
parsing the received and addressed data to identify a message portion of the data;
generating sending data containing the message portion along with at least one of a preamble or a postamble appropriate for use in the second wireless network.

15. The device of claim 11 further comprising memory for retaining data received from at least one of the first wireless network and the second wireless network for later access.

16. A wireless communication system comprising:
a first device operating a first wireless communication protocol of a first wireless network;
a second device operating a second wireless communication protocol of a second wireless network;
a third device having control circuitry and transceiver circuitry, the control circuitry configured to operate the transceiver circuitry using each of the first wireless communication protocol and the second wireless communication protocol, the third device further includes input/output hardware configured for communicating with a non-wireless communication protocol, the control circuitry being further configured to filter a received message in accordance with a security protocol for a network to which the received message is addressed to limit data access between the first device and the second device, wherein a level of the security protocol is different for two or more of the first wireless communication protocol, the second wireless communication protocol, and non-wireless communication protocol; and
wherein said third device received data from one or more of the first device, the second device and/or a fourth device, which includes data related to one or more environmental or industrial conditions.

17. The wireless communication system of claim 16 wherein the control circuitry of the third device is further configured to direct data of the received message, when so addressed, from one of the first device or the second device to a wired device on a wired network.

18. The wireless communication system of claim 17 wherein the control circuitry if further configured to limit data access between the first device and the wired device and/or the second device and the wired device.

19. The wireless communication system of claim 17 wherein the filter allows uni-directional access between at least two of the first device, the second device, and the wired device.

20. The wireless communication system of claim 16 wherein a level of the security protocol for the first wireless communication protocol, the second wireless communication protocol, and non-wireless communication protocol are different.

21. The wireless communication system of claim 16 wherein a level of the security protocol are different according to the direction the message is going.

22. The wireless communication system of claim 16 wherein the filter allows uni-directional access between the first device and the second device.

* * * * *